United States Patent

Fukuma

[19]

[11] Patent Number: 5,909,668
[45] Date of Patent: Jun. 1, 1999

[54] BANQUET HALL RESERVATION MANAGEMENT SYSTEM

[75] Inventor: Mikio Fukuma, Kawasaki, Japan

[73] Assignee: Fujitsu Limited, Kawasaki, Japan

[21] Appl. No.: 08/705,855

[22] Filed: Aug. 28, 1996

[30] Foreign Application Priority Data

Nov. 13, 1995 [JP] Japan ..................................... 7-294464

[51] Int. Cl.⁶ ............................ G06F 15/00; G06F 15/20; G06F 15/21; G06F 15/22
[52] U.S. Cl. ......................... 705/5; 705/6; 705/7; 705/8; 705/15
[58] Field of Search .................. 705/5, 6, 7, 8, 705/15

[56] References Cited

U.S. PATENT DOCUMENTS

| | | | |
|---|---|---|---|
| 3,656,113 | 4/1972 | Lince | 340/825.28 |
| 5,197,000 | 3/1993 | Vincent | 705/8 |
| 5,270,920 | 12/1993 | Pearse et al. | 705/8 |
| 5,404,291 | 4/1995 | Kerr et al. | 705/5 |
| 5,732,399 | 3/1998 | Katiyar et al. | 705/8 |

FOREIGN PATENT DOCUMENTS 5-81285   4/1993   Japan .

*Primary Examiner*—Allen R. MacDonald
*Assistant Examiner*—James W. Myhre
*Attorney, Agent, or Firm*—Staas & Halsey

[57] ABSTRACT

The present invention relates to providing a banquet hall reservation management system for managing reservation and vacancy status of divisible banquet halls even when a partition pattern of a banquet hall is changed without changing the application program. Hence, the work load of the banquet hall provider is reduced, and the quality of service increased. The banquet hall reservation management system includes a management table where conflicting areas due to using a banquet area are registered, a management information input means to input names of new banquet areas and their conflicting areas in the event of changing partition pattern, and a management table generating means that creates a new management table based on the management information obtained by the management information input means.

8 Claims, 17 Drawing Sheets

FIG. 4

| AREA CODE | BANQUET AREA NAME | TYPE | CONFLICTING AREA CODE |
|---|---|---|---|
| 10 | FUJI | MAIN BANQUER AREA | 10、11、12、13、14、15 |
| 11 | FUJI 1 | PARTITIONED AREA | 11、10、14 |
| 12 | FUJI 2 | PARTITIONED AREA | 12、10、14、15 |
| 13 | FUJI 3 | PARTITIONED AREA | 13、10、15 |
| 14 | FUJI NORTH | PARTITIONED AREA | 14、10、11、12、15 |
| 15 | FUJI SOUTH | PARTITIONED AREA | 15、10、12、13、14 |

FIG. 5

| | | FEBRUARY 3, 1995 | | | |
| | | FEBRUARY 2, 1995 | | | |
| | | FEBRUARY 1, 1995 | | | |

| AREA CODE | 13:00 | 14:00 | 15:00 | 16:00 | 17:00 |
|---|---|---|---|---|---|
| 10 | 0 | 3 | 3 | 3 | 0 |
| 11 | 0 | M1 | M1 | M1 | 0 |
| 12 | 0 | D1 | D1 | D1 | 0 |
| 13 | 0 | D1 | D1 | D1 | 0 |
| 14 | 0 | 2 | 2 | 2 | 0 |
| 15 | 0 | 2 | 2 | 2 | 0 |

M: MEETING
D: DINNER

FIG. 10

| MANAGEMENT INFORMATION INPUT SCREEN | | | |
|---|---|---|---|
| PLEASE INPUT BANQUET AREA NAMES | | | |
| AREA CODE | BANQUET AREA NAME | TYPE | CONFLICTING AREA CODE |
| 10 | | | |
| 11 | | | |
| 12 | | | |
| 13 | | | |
| 14 | | | |
| 15 | | | |
| 16 | | | |

FIG. 11

| MANAGEMENT INFORMATION INPUT SCREEN | | | |
|---|---|---|---|
| PLEASE INPUT TYPE | | | |
| AREA CODE | BANQUET AREA NAME | TYPE | CONFLICTING AREA CODE |
| 1 0 | | | |
| 1 1 | | | |
| 1 2 | | | |
| 1 3 | | | |
| 1 4 | | | |
| 1 5 | | | |
| 1 6 | | | |

FIG. 12

| MANAGEMENT INFORMATION INPUT SCREEN | | | |
|---|---|---|---|
| PLEASE INPUT CONFLICTING AREA CODE | | | |
| AREA CODE | BANQUET AREA NAME | TYPE | CONFLICTING AREA CODE |
| 10 | | | |
| 11 | | | |
| 12 | | | |
| 13 | | | |
| 14 | | | |
| 15 | | | |
| 16 | | | |

FIG. 15

```
┌─────────────────────────────────────────────────────┐
│ RESERVATION INFORMATION INPUT SCREEN                │
├─────────────────────────────────────────────────────┤
│                                                     │
│   PLEASE INPUT THE NAME OF DESIRED BANQUET AREA     │
│                                                     │
│                                                     │
│     RESERVATION : 0001    REGISTRATION              │
│     NUMBER                                          │
│                                                     │
│                                                     │
│     PARTY NAME :                                    │
│                                                     │
│                                                     │
│         DATE :                                      │
│                                                     │
│                                                     │
│     BANQUET AREA :              │
│     NAME                                            │
│                                                     │
│         PURPOSE .                                   │
│         OF USE  ·                                   │
│                                                     │
│                                                     │
│          TIME :                                     │
│                                                     │
└─────────────────────────────────────────────────────┘
```

RESERVATION INFORMATION INPUT SCREEN

PLEASE INPUT A PURPOSE OF USE OF THE BANQUET AREA

RESERVATION NUMBER : 0001    REGISTRATION

PARTY NAME :

DATE :

BANQUET AREA NAME :

PURPOSE OF USE :

TIME :

BANQUET HALL RESERVATION MANAGEMENT SYSTEM

BACKGROUND OF THE INVENTION

1. Field of the Invention

The present invention relates to a system of managing reservation and utilization of banquet and conference halls.

2. Prior Art

Large banquet and conference halls are infrequently used to their maximum capacity, and are often used by less than half the number of guests that the halls are planned to hold. In other words, it is inefficient that a banquet hall capable of holding a hundred people is used for twenty people, as only one quarter or one fifth of the space is sufficient for twenty people, leaving the three quarters or four fifth of the space unused. Thus, a banquet hall of a certain size is structured so that the hall can be divided into a plurality of smaller areas. Adopting this structure allows a few groups of guests to simultaneously use the banquet hall, thereby increasing the efficiency of space utility. It is to be desired that the reservation status and occupancy status of such banquet halls are accurately managed by a program logic in order to decrease the work load of the banquet hall provider. Furthermore, it is also to be desired that a program logic can not only manage a regular pattern of division of a banquet hall, but also can manage a irregular pattern of division. For example, it is desirable that a program logic does not only manages a banquet hall capable of being partitioned into three areas to be used as one room or three smaller rooms, but also manages irregular partition pattern such as to divide the banquet hall into one third area and the other taking two thirds area. Therefore, the program logic is advantageously for decrease risk for making errors, because the provider is not required to handle the complicated task of managing the pattern on paper. The present invention is designed in cosideration of the demand mentioned above. It is an object of the present invention is to provide a reservation/vacancy management system with a technology that can handle regular partition patterns and irregular partition patterns in order to decrease the work load of the banquet hall provider and improve the quality of service.

SUMMARY OF THE INVENTION

The present invention has adopted the following means in order to achieve the above object.

This invention is applied to a system for managing reservation of banquet halls capable of being partitioned into a plurality of areas, one area or combination of areas can being used as one banquet area.

A banquet hall reservation management system of the present invention comprises management table, reservation management table, vacancy determination means, conflicting area detecting means, and reservation means.

The management table is registered with conflicting areas for each banquet area. These conflicting areas are areas which are unable to be used while a banquet area is used.

The reservation management table registers reservation information for each banquet area.

The vacancy determination means determines whether or not an arbitrary banquet area is unreserved on elected date.

The conflicting area detecting means detects conflicting areas for an arbitrary banquet area.

The reservation means writes reservation information indicating that a arbitrary banquet area and its conflicting areas will be used on the elected date into the reservation management table.

The operation of the banquet hall reservation management system of the present invention shall be described below.

When the banquet hall provider inputs a arbitrary banquet area and a date into the system, the vacancy determination means accesses the reservation management table in order to determine whether or not the arbitrary banquet area is unreserved on the date. If the arbitrary banquet area is unreserved on the date, conflicting area detecting means accesses the management table according to the arbitrary banquet area. And the conflicting area detecting means detects the conflicting areas which are unable to be used while the banquet area is used. A information concerning the banquet area and the conflicting areas detected by the conflicting area detecting means is informed to the reservation means.

The reservation means writes a reservation information indicating that the banquet area and the conflicting area will be used on the date into the reservation management table. For example, the reservation management table may register the purpose identification information which identifies the purpose of using the banquet area as reservation information of the banquet area, and register the number of banquet areas which inhibit the conflicting area from being used while the banquet areas are used as reservation information of the each conflicting area.

Furthermore, the reservation management table may comprise a plural of reservation management tables. The each of those reservation management tables registers reservation information of a day. In this case, if the reservation management table does not have a reservation management table corresponding to the date, the reservation means generates a new reservation management table and writes the purpose identification information for the banquet area as a reservation information of the banquet area, and writes the initial value "1" as a reservation information of the banquet areas.

When a reservation for a banquet area is canseled, the conflicting area detecting means detects the conflicting areas of the banquet area by referring to the management table. Then, the reservation means erases the purpose identification information of the banquet area from the reservation management table and decrements the reservation information of the conflicting areas by one.

Meanwhile, when the partition patterns of the banquet hall is changed, or when the banquet hall reservation management system is started, a banquet hall provider inputs information concerning new banquet areas and their conflicting areas into the system. In response to above operation, a management information input means enters the information inputted by the provider in a management table generating means. The management table generating means generates a new management table according to the information entered by the management information input means.

BRIEF DESCRIPTION OF THE DRAWINGS

FIG. 4 is a diagram showing a specific example of a management table in embodiment to the present invention;

FIG. 5 is a diagram showing a specific example of a group of reservation management tables in embodiment of the present invention;

FIG. 10 is a diagram showing a specific example (1) of a management information input screen in embodiment of the present invention;

FIG. 11 is a diagram showing a specific example (2) of a management information input screen in embodiment of the present invention;

FIG. 12 is a diagram showing a specific example (3) of a management information input screen in embodiment of the present invention;

FIG. 15 a diagram showing a specific example (3) of a reservation information input screen in embodiment of the present invention;

DETAILED DESCRIPTION OF THE PREFERRED EMBODIMENTS

EMBODIMENT 1

Figure 1:
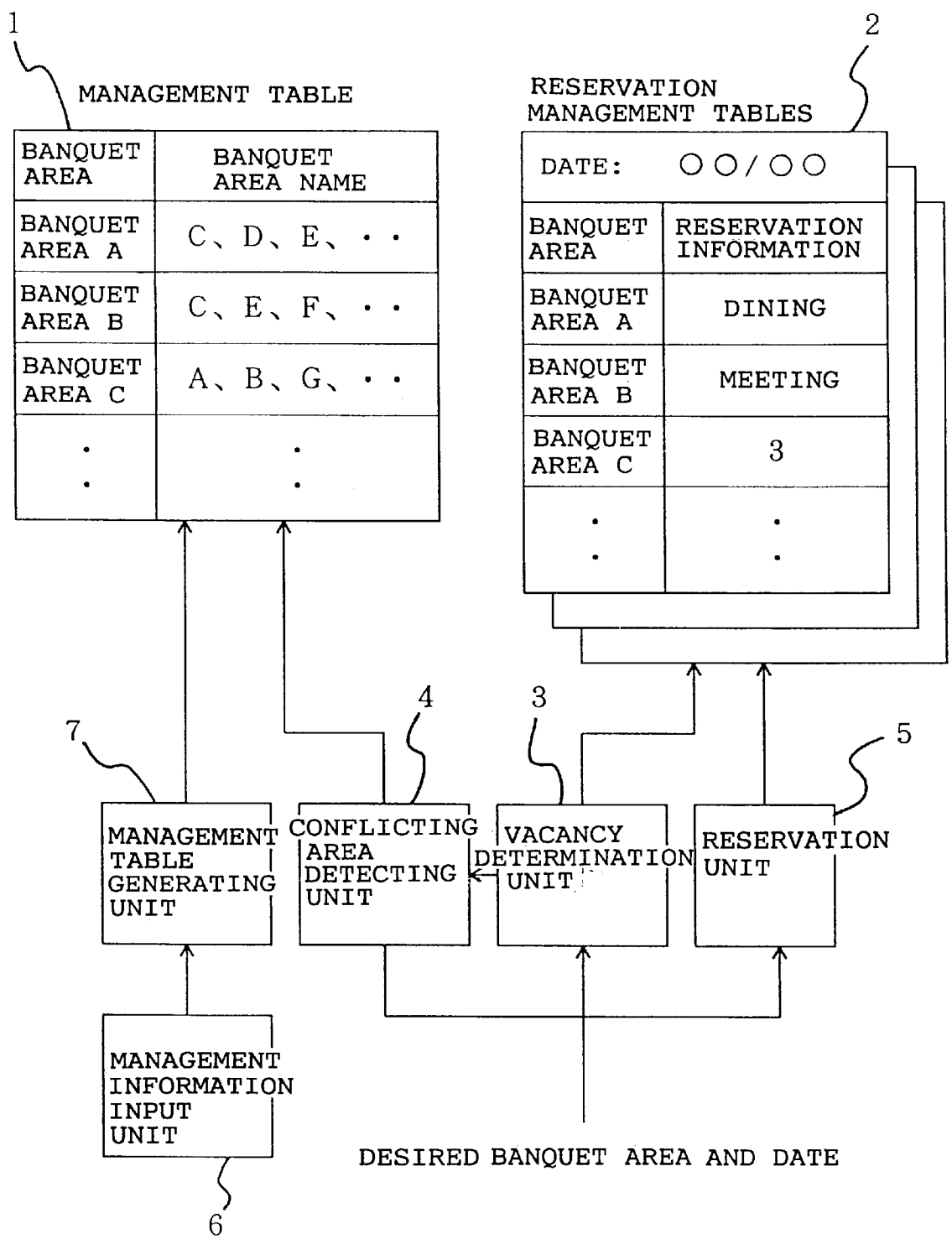
FIG. 1 is a block diagram showing the principle structures of the present invention.

The banquet hall reservation management system in this embodiment is applied to a system for managing a banquet hall. In this case, the banquet hall can be partitioned into a plurality of areas, and each of divided areas or combination of the divided areas are capable of being used as one banquet area FIG. 1 illustrates a principle structures of the present invention.

This system comprises a management table 1, a group of reservation management tables 2, a vacancy determination unit 3, a conflicting area detecting unit 4, a reservation unit 5, a management information input unit 6, and management table generating unit 7.

The management table 1 is registered with the information indicating conflicting areas for each banquet area; i.e., conflicting areas that are unable to be simultaneously used when a banquet area is used. For example, a banquet hall partitionable into three areas, A, B, and C may be used as one banquet area of combination of areas A, B, and C (area A+B+C), as three banquet areas of banquet area A, banquet area B and banquet area C, as two banquet areas of banquet area A and banquet area (B+C) which is combination of area B and area C, or as two banquet areas of banquet area C and banquet area (A+B) which is combination of area A and area B. Here, when the area A is reserved as a banquet area, area A, area A+B+C and area A+B may not be used as a banquet area. Therefore, three areas of area A, area (A+B) and area (A+B+C) are equivalent to the conflicting areas of the banquet area A, so that the management table 1 registers the areas A, A+B+C, and A+B as conflicting areas of the banquet area A.

The group of reservation management tables 2 is comprised of a set of reservation management tables per date. Namely, the each reservation management table registers reservation information indicating whether or not each banquet area is reserved on one day. The reservation information includes the purpose identification information which identifies a purpose of using the banquet area as reservation information of the banquet area, and includes the number of banquet areas which are already reserved and inhibit a conflicting area from being used while the banquet areas are used as reservation information of the conflicting area. For example, when a area A+B of a banquet hall where is capable of being partitioned into three areas (A, B, C) is reserved as one banquet area, "1" will be registered to conflicting areas of the banquet area A+B, namely A, B, A+B, B+C, and A+B+C. When the two banquet areas A+B and C are respectively reserved as one banquet area, the reservation information of the common conflicting areas A+B+C and B+C will be respectively "2." The purpose identification information, for example, permits identification of whether a banquet area is used for a meeting or for dining.

The vacancy determination unit 3 determines whether or not a banquet area selected by a customer is unreserved on day selected by the customer, by referring to the reservation management tables 2.

The conflicting area detecting unit 4 refers to the management table 1 and then detects the conflicting areas of the selected banquet area. The reservation unit 5 writes the reservation information concerning the selected banquet area and the conflicting areas into the reservation management tables.

The management information input unit 6 is an input device used for user who inputs data or command into this system. For example, when the partition patterns of the banquet hall is changed, or when this system is started, the user inputs the names of new banquet areas and their conflicting areas through the management information input unit 6.

The management table generating unit 7 generates a new management table 1 in accordance with the management information inputted by the management information input unit 6.

The operation of the present invention shall be described below.

When starting the banquet hall reservation management system, the banquet hall provider decides the partition patterns of the banquet halls, and inputs information concerning banquet areas and their conflicting areas into the system. In doing so, the management information input unit 6 will enter this information to the management table generating unit 7.

The management table generating unit 7 generates the management table 1 in accordance with the information inputted by the management information input unit 6. If a memory of this system holds a predetermined format of the management table, the management table generating unit 7 generates the management table 1 by reading out the management table format from the memory and writing the information for the banquet areas and the conflicting areas into the format.

Meanwhile, when the banquet hall provider inputs a data idetifying a arbitrary banquet area and elected date into this system, the vacancy determination unit 3 will access the group of reservation management tables 2 and determines whether a reservation management table 2 corresponding to the elected date already exists or not. As none of the reservation management tables 2 of any date exists here, the conflicting area detecting unit 4 refers to the management table 1 in order to read out the data indicating the conflicting areas of the banquet area, then notifies the reservation unit 5 of the banquet area identification data, the conflicting area indicating data and the elected date.

The reservation unit 5 generates a reservation management table 2 corresponding to the elected date according to the banquet area identification data and the conflicting area indicating data. At this point, if a memory of this system holds a predetermined format of a reservation management table, the reservation unit 5 can generate a reservation management table 2 corresponding to the elected date by reading out the format of the reservation management table from the memory and writing the banquet area identification data and the conflicting area indicating data into the format. The reservation unit 5 further writes a purpose identification information identifying the purpose of using the banquet area as a part of reservation information of the banquet area and initial numeral "1" as the reservation information of the conflicting areas into the reservation management table 20.

When the banquet hall provider inputs a data identifying a arbitrary banquet area and a date after a few operations of reservation are executed in the above mentioned manner, the vacancy determination unit 3 will access the group of reservation management tables 2 and detects the reservation management table 2 corresponding to the date inputted by the provider. Then the vacancy determination unit 3 determines whether the banquet area is unreserved by referring to the reservation management table 2 corresponding to the date. If the banquet area is unreserved, the vacancy determination unit 3 will make the conflicting area detecting unit 4 detect the conflicting area of the banquet area.

The conflicting area detecting unit 4 accesses the management table 1 according to the banquet area identification data, and reads out the data indicating the conflicting areas of the banquet area from the management table 1. Then the conflicting area detecting unit 4 notifies the reservation unit 5 of the banquet area identification data, the conflicting areas indicating data and the date.

The reservation unit 5 writes the purpose identification information as a part of reservation information of the banquet area into the reservation management table 2, and increments the number of reserved areas relevant to the conflicting areas by one as the reservation information of the conflicting areas.

When the banquet hall provider inputs a command to cancel a reservation of a banquet area and a date, the conflicting area detecting unit 4 detects the data indicating the conflicting areas of the banquet area referring to the management table 1. Then, the reservation unit 5 accesses the reservation management table 2 corresponding to the data inputted by the provider. And the reservation unit 5 erases the purpose identification information of the banquet area from the reservation management table 2, and writes information indicating the vacancy, as well as decrementing by one the reservation number of banquet areas which are already reserved and inhibit the conflicting areas from being used when the banquet areas are used.

When changing the partition patterns of the banquet hall, the banquet hall provider inputs information concerning new banquet areas and their conflicting areas into the system. In doing so, the system erases the previous management table 1 and excutes the same operation as the starting operation of this system.

EMBODIMENT 2

Hereinafter, embodiments according to the present invention will be described in further detail.

To describe the basic function of the banquet hall reservation management system, it is assumed that a personal computer shall be used as the hardware to realize the banquet hall reservation management system of the present invention.

Figure 2:
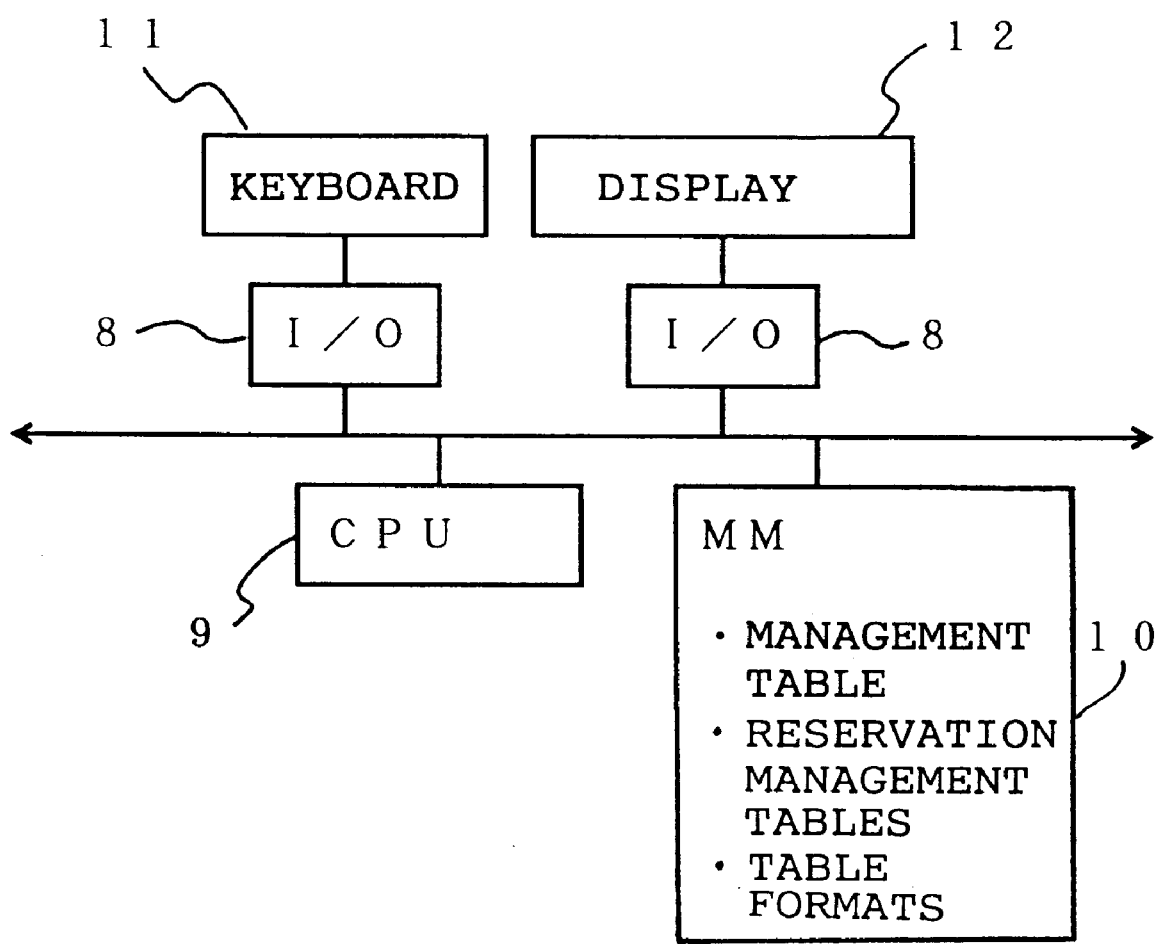
FIG. 2 is a block diagram showing the hardware structure of personal computer applied to the system.

FIG. 2 shows a hardware structure of the personal computer The personal computer 8 comprises a CPU (central processing unit) 9, and a main memory (M/M) 10 connected to the CPU 9 by a bus. A keyboard 11 and a display 12 are also connected to the bus through an input/output device (I/O) 8.

The main memory (M/M) 10 stores an application program to be executed by the CPU 9, as well as the management table, the group of reservation management tables, and all table formats of the present invention, are recorded in the main memory (M/M) 10. The banquet hall reservation management system is realized by the CPU 9 executing the application program of the main memory (M/M) 10. The structure of the system shall be explained later.

Figure 3:
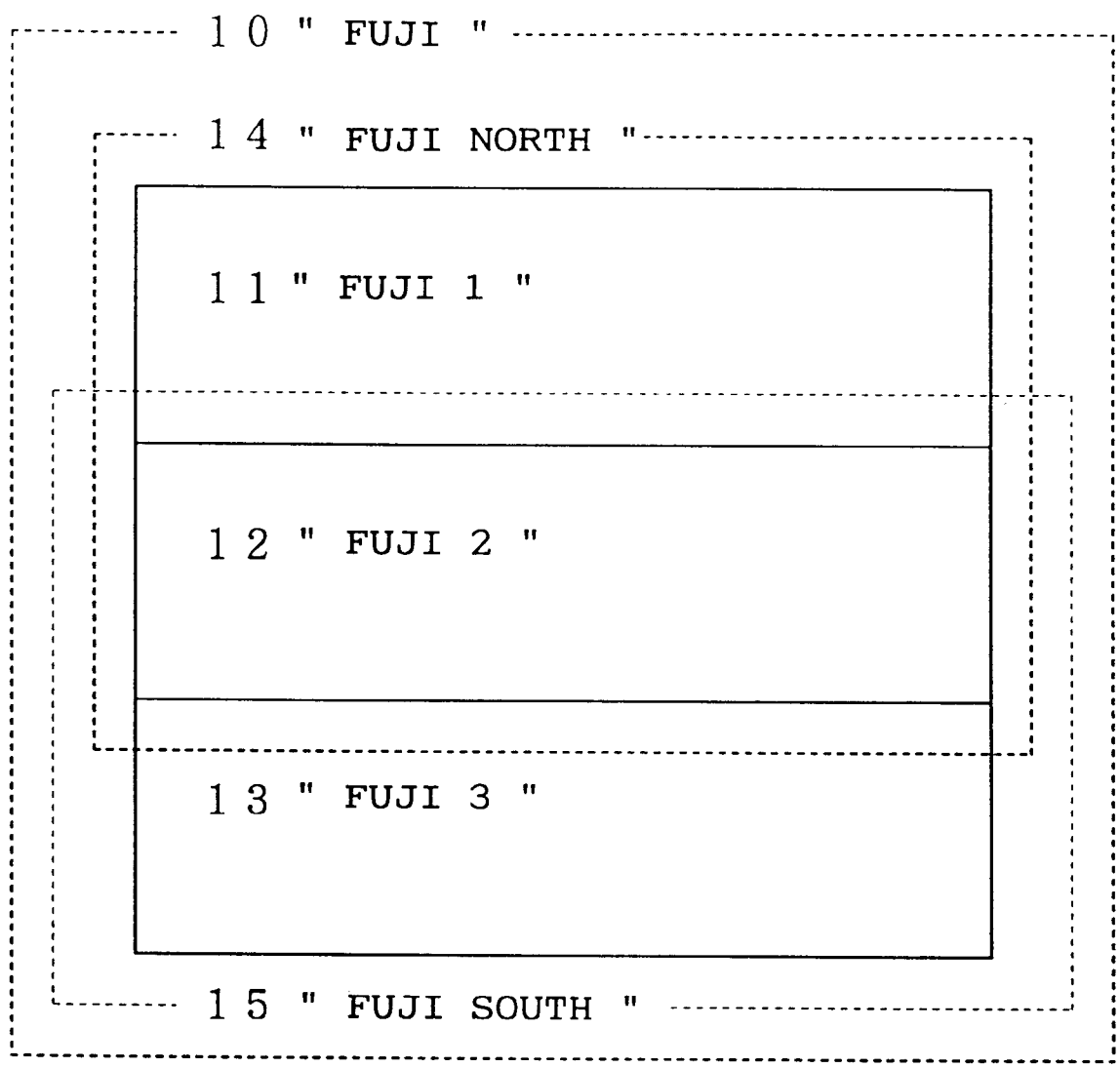
FIG. 3 is a diagram showing a partition pattern of a banquet hall managed by the system.

FIG. 3 shows a specific example of a banquet hall used in this embodiment.

In this embodiment, the banquet hall reservation management system shall manage the reservation of a banquet area called "Fuji" divisible into three areas, such as "Fuji 1," "Fuji 2," and "Fuji 3". The banquet hall "Fuji" can be partitioned into three independent areas "Fuji 1," "Fuji 2," and "Fuji 3," or two areas such as "Fuji North" which is one banquet area combined the "Fuji 1" with "Fuji 2," and "Fuji 3," or "Fuji 1" and "Fuji South" which is one banquet area combined the "Fuji 2" with "Fuji 3, " or one area such as "Fuji."

Further, area codes will be assigned to respective banquet areas of all partition patters in order to distinguish one from another. As shown in the FIG. 3, the banquet area "Fuji" is assigned with an area code "10," "Fuji 1" with "11," "Fuji 2" with "12," "Fuji 3" with "13," "Fuji North" with "14," "Fuji South" with "15."

FIG. 4 shows a structure of a management table corresponding to the areas drawn in FIG. 3. The management table, in this embodiment, registers banquet area name, type, and conflicting area codes per each banquet area code.

The type refers to the information registered to describe the property of the banquet hall. The property is defined as the information to determine whether the banquet hall is a full span room or a partitioned area of a room. The original size of the room is defined as a main banquet area, and a partitioned banquet area as partitioned area. The banquet area "Fuji" in this embodiment shall be referred to as the main banquet area and all the other banquet areas as partitioned areas. The conflicting areas codes cells are registered with the conflicting area codes. For example, when the banquet area "Fuji" (area code 10) is used, the banquet areas "Fuji" (area code 10), "Fuji 1" (area code 11), "Fuji 2" (area code 12), "Fuji 3" (area code 13), "Fuji North" (area code 14), and "Fuji South" (area code 15), may not be used. Therefore, these area codes will be registered as conflicting area codes. Also, when the banquet area "Fuji 1" (area code 11) is used, the banquet areas "Fuji 1" (area code 11), "Fuji" (area code 10), and "Fuji North" (area code 14) may not be used. Thus, these area codes will be registered as conflicting areas codes. Further, when the banquet area "Fuji 2" (area code 12) is used, the banquet areas "Fuji 2" (area code 12), "Fuji" (area code 10), "Fuji North" (area code 14), and "Fuji South" (area code 15) may not be used. Therefore, these area codes will be registered as conflicting area codes. Likewise, the conflicting areas for all other banquet areas are registered.

FIG. 5 shows a structure of a group of reservation management table. As shown in the table, the group of reservation management tables is a set of daily reservation management tables. Each table contains reservation information by area codes of the banquet areas. The reservation information is recorded on an hourly basis, and each cell contains identification information to indicate the availability. A banquet area with an actual booking will be registered with purpose identification information. As for the purpose identification information, a code to describe the purpose of use, for example "M" for meeting or "D" for dinner may be used. The conflicting areas of the booked banquet area will be registered with the number of reservations as codes. The number of booking indicates number of reservations made for corresponding banquet areas of the conflicting areas (a banquet area having a banquet area as its conflicting area). For example, the banquet area "Fuji North " (area code 14) is a conflicting area for four banquet areas, "Fuji" (area code 10), "Fuji 1" (area code 11), "Fuji 2" (area code 12), and "Fuji South" (area code 15). As "Fuji 1" (area code 11) and "Fuji 2" (area code 12) are actually booked, "2" is registered to "Fuji North" (area code 14) as a number of reservation. Likewise, the banquet area "Fuji South " (area code 15) is a conflicting area for four banquet areas, "Fuji" (area code 10), "Fuji 2" (area code 12), "Fuji 3" (area code 13), and "Fuji North" (area code 14). As "Fuji 2" (area code 12) and "Fuji 3" (area code 13) are actually booked, "2" is registered to "Fuji South" (area code 15) as a number of reservation. Further, the banquet area "Fuji" (area code 10) is a conflicting area for five banquet areas, "Fuji 1" (area code 11), "Fuji 2" (area code 12), "Fuji 3" (area code 13), "Fuji North" (area code 14), and "Fuji South" (area code 15). As "Fuji 1" (area code 11), "Fuji 2" (area code 12), and "Fuji 3" (area code 13) are actually booked, "" is registered to "Fuji" (area code 10) as a number of reservation. The initial figure for discrimination information to indicate the existence of any reservation is "0," and is overwritten with the purpose identification information when a booking is made. The reservation number in its conflicting areas is increased by one. If a reservation, on the other hand, is canceled, the purpose identification information of the booked banquet area is changed to "0," and the reservation number of its conflicting areas will be decreased by one.

Figure 6:
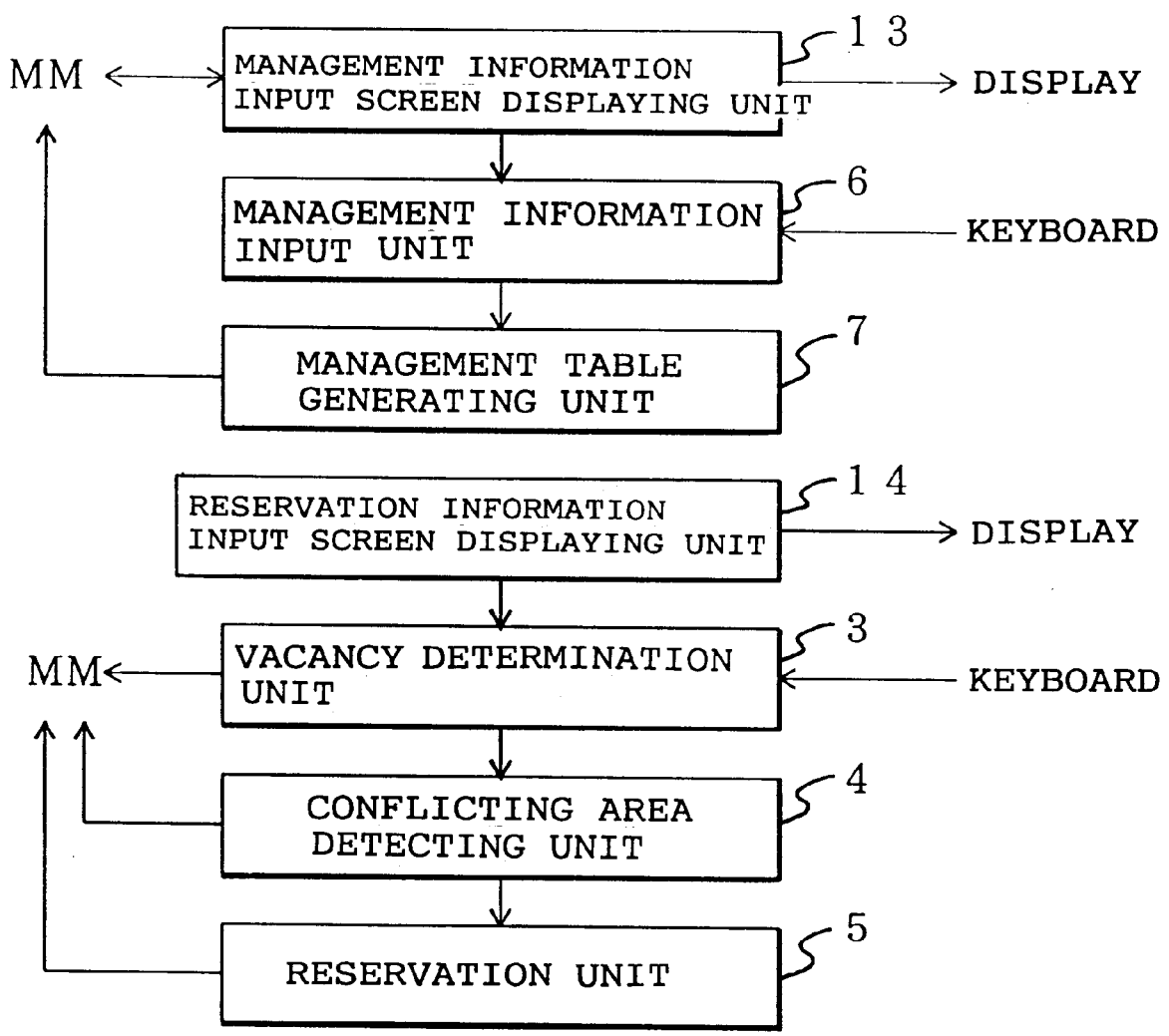
FIG. 6 is a block diagram showing functional structures of the banquet hall reservation management system in embodiment of the present invention.

The structures of functions of the banquet hall reservation management system of this embodiment shall be described next with reference to FIG. 6. The element of structure shown in the diagram indicates the function achieved by the aforementioned CPU 9 executing the application program, installed in the main memory (MM) 10, and the functions are drawn in blocks.

According to this embodiment, in addition to the vacancy determination unit 3, the conflicting area detecting unit 4, the reservation unit 5, the management information input unit 6, the management table generating unit 7, the banquet hall reservation management system comprising a management information input screen displaying unit 13 and a reservation information input screen displaying unit 14.

First of all, the reservation information input screen displaying unit 14 outputs the reservation information input screen from the display 12.

When the user inputs a name of a preferred banquet area, a date and time to be occupied, the vacancy determination unit 3 refers to the reservation management table 2 of the date to determine the availability of the preferred banquet area.

The conflicting area detecting unit 4 refers to the management table and reads the area codes of the conflicting areas of the input banquet area name. The reservation unit 5 registers reservation information of the banquet area to the reservation management table of the date input by the user. If the reservation management table of the date input by the user does not exist, the reservation unit 5 reads a reservation management table format from the main memory (MM) 10 and writes the banquet area code and reservation information, thereby creating a reservation management table.

The management information input screen displaying unit 13 is activated when the system is initialized or when the partition pattern of a banquet hall is changed, and puts out an input screen to input area codes of banquet areas, banquet area names, types, and area codes of the conflicting areas on the display 12. When the user inputs an area code of a banquet area, the banquet area name, type, and area codes of the conflicting areas, the management information input unit 6 transmits the information to the management table generating unit 7 as management information. The management table generating unit 7 reads the management table format from the main memory (MM) 10 and writes in the management information transmitted by the management information input unit 6, thereby creating a management table.

The operation of the banquet hall reservation management system of this embodiment will be explained below. The operation of the banquet hall reservation management system, when creating a management table, shall be described next with reference to FIG. 7.

The banquet hall provider, when using this system, first decides a partition pattern of a banquet hall, and inputs the command requesting to input management information through the keyboard 11. Upon receiving the command (step 701), the management information input unit 6 of the system activates the management information input screen displaying unit 13.

The management information input screen displaying unit 13 reads out the management information input screen format from the main memory (MM) 10 and outputs it on the display 12 (step 702). The management information input screen provides three input items, namely "banquet area name," "type," and "conflicting area code" for each area code. And the management information input screen displaying unit 13, as shown in FIG. 10, displays a message to prompt the inputting of the "banquet area name" on the management information input screen (step 703). In response to the message, the banquet hall provider inputs banquet area names to each area code. When the provider finishes inputting the names (704), the management information input screen displaying unit 13, as shown in FIG. 11, will display a message to prompt the inputting of "type" on the management information input screen (step 705). When the provider finishes inputting the types (706), the management information input screen displaying unit 13, as shown in FIG. 12, will display a message to prompt the inputting of "conflicting area code" on the management information input screen (step 707). When the provider finishes inputting the conflicting area codes, the management information input unit 6 will transmit the data on the management information input screen to the management table generating unit 7.

The management table generating unit 7 reads the management table format from the main memory (MM) 10 and writes in the management information notified by the management information input unit 6, thereby creating a management table (step 709).

The management table created by the management table generating unit 7 is recorded to the main memory (MM) 10. When changing the management table, the management information input screen displaying unit 13 first outputs a message through the display 12 for the banquet hall provider to select whether the management table is to be completely or partially recreated.

Figure 7:
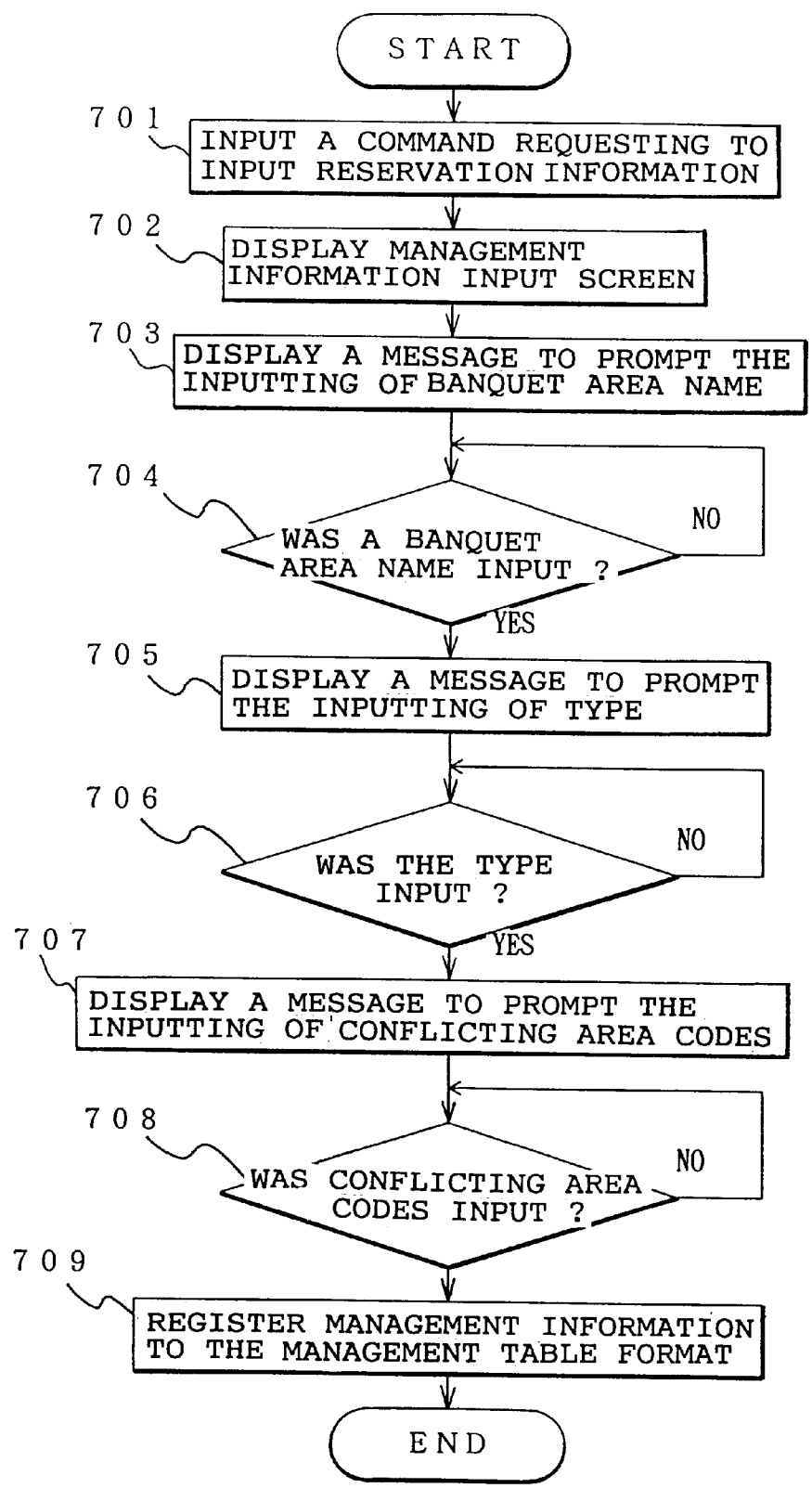
FIG. 7 is a flow chart of the operation of the system for creating a management table.

When the banquet hall provider selects the recreation process of the management information, the same procedure as explained in FIG. 7 will be repeated. When the provider selects the partial recreation of the management table, the management information input screen displaying unit 13 reads the content of the management table from the main memory (MM) 10, and outputs the information from the display 12. The management information input screen displaying unit 13, at this point, simultaneously displays a message to prompt the provider to select the information to be changed. When the provider highlights the area to be changed, and changes the selected data, the management information input unit 6 will transmit the revised data to the management table generating unit 7. The management table generating unit 7 changes the management table in the main memory (MM) 10 according to the data transmitted by the management information input unit 6.

Figure 8:
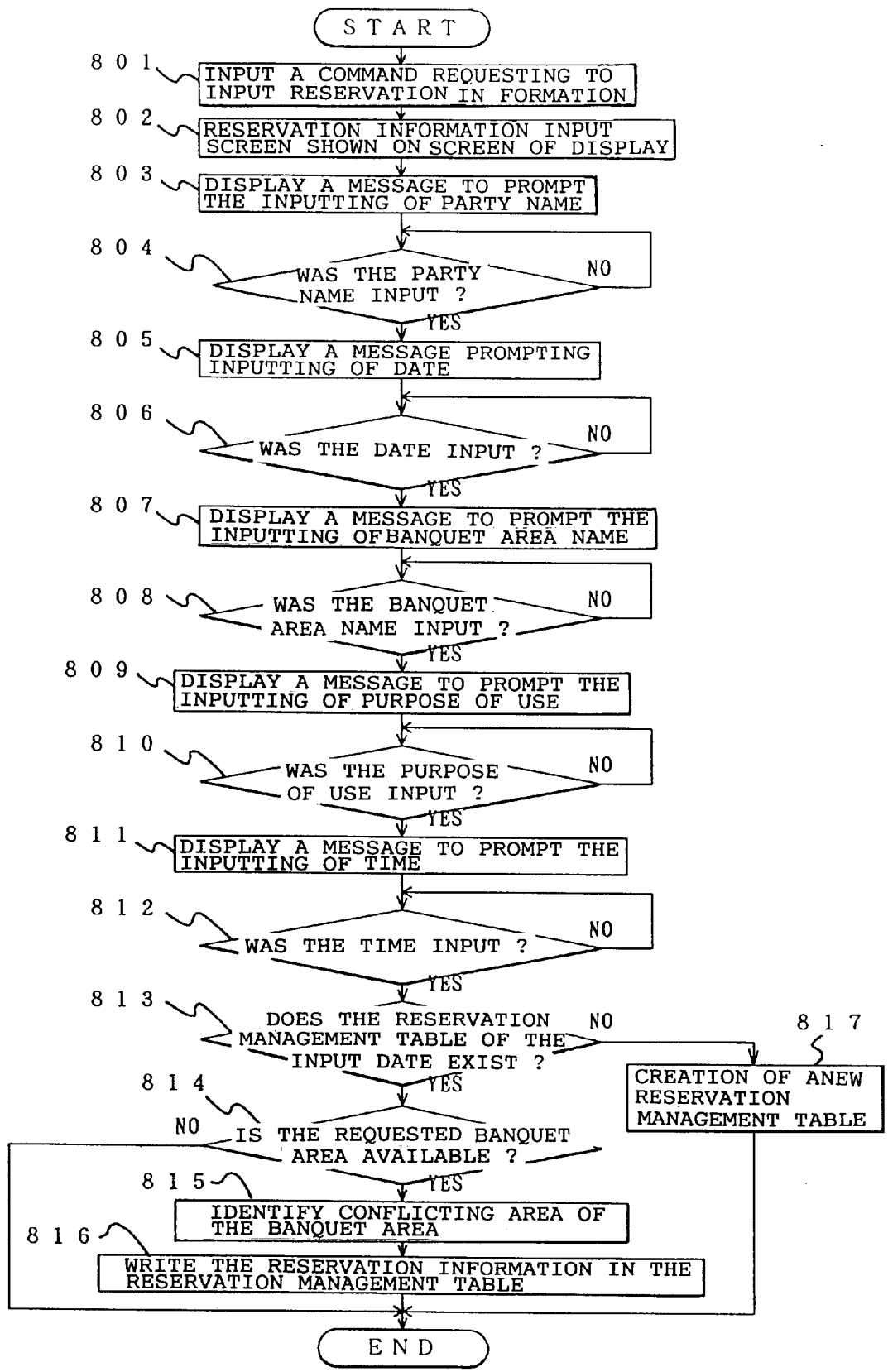
FIG. 8 is a flow chart of the operation of the system for making a reservation.

The operation of the banquet hall reservation management system, when processing a reservation, shall be described next with reference to FIG. 8.

Upon receiving a request to use a banquet hall, the banquet hall provider determines a banquet area based on the purpose of use and the expected number of guests, and inputs a command requesting to input reservation information to the banquet hall reservation management system (step 801).

Upon receiving the command, the banquet hall reservation management system activates the reservation information input screen displaying unit 14.

The reservation information input screen displaying unit 14 reads the reservation information input screen format from the main memory (MM) 10 and outputs it on the display 12 (step 802). The management information input screen provides five input items, namely "party name," "date," "banquet area name," "purpose of use," and "time to be occupied." Each reservation information input screen provides a reservation number to specify individual reservations.

Figure 13:
FIG. 13 is a diagram showing a specific example (1) of a reservation information input screen in embodiment of the present invention.
Figure 14:
FIG. 14 is a diagram showing a specific example (2) of a reservation information input screen in embodiment of the present invention.
Figure 16:
FIG. 16 a diagram showing a specific example (4) of a reservation information input screen in embodiment of the present invention.

As well, the reservation information input screen displaying unit 14, as shown in FIG. 13, displays a message to prompt the inputting of the "party name" on the reservation information input screen (step 803). When the provider inputs the party name from the keyboard 11 (step 804), the reservation information input screen displaying unit 13, as shown in FIG. 14, will display a message to prompt the inputting of "date" on the reservation information input screen (step 805). When the provider inputs the date from the keyboard 11 (806), the reservation information input screen displaying unit 14, as shown in FIG. 15, will display a message to prompt the inputting of "banquet area name" on the reservation information input screen (step 807). When the provider inputs the banquet area name (step 808), the reservation information input screen displaying unit 14, as shown in FIG. 16, will display a message to prompt the inputting of "purpose of use" on the reservation information input screen (step 809). The system may have a function of displaying a plurality of purposes of use to make the provider choose between them for the inputting of the "purpose of use."

Figure 17:
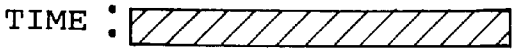
FIG. 17 a diagram showing a specific example (5) of a reservation information input screen in embodiment of the present invention.

When the provider inputs the purpose of use from the keyboard 11 (step 810), the reservation information input screen displaying unit 14, as shown in FIG. 17, will display a message to prompt the inputting of "time to be occupied" on the reservation information input screen (step 811). The number of hours should be input in this cell.

When the provider inputs the time to be occupied from the keyboard 11 (step 812), the reservation information input screen displaying unit 14 will notify the party name, date, and time to be occupied to the vacancy determination unit 3.

The vacancy determination unit 3 searches the group of reservation management tables in the main memory (MM) 10 and determines whether a reservation management table of the date has been registered or not (step 813). If the table of the date exists, the vacancy determination unit 3 refers to the reservation management table to determine whether the banquet area is available or not at the time. In other words, the vacancy determination unit 3 determines whether "0" is registered or not in the time cell of the banquet area of the requested time (step 814). If the banquet area is available during the time, the vacancy determination unit 3 transmits the banquet area name to the conflicting area detecting unit 4.

The conflicting area detecting unit 4 accesses the management table in the main memory (MM) 10 and reads the area code of the banquet area and its conflicting area codes (step 815). Then the conflicting area detecting unit 4 transmits the area code of the banquet area and its conflicting area codes to the reservation unit 5.

The reservation unit 5 registers the displayed data on the reservation information input screen to the main memory (MM) 10. The reservation unit 5 registers the purpose identification information to the time cells of the banquet area Further, the reservation unit 5 increments the number of reservations registered in the time cells of the conflicting areas by one (step 816).

Figure 9:
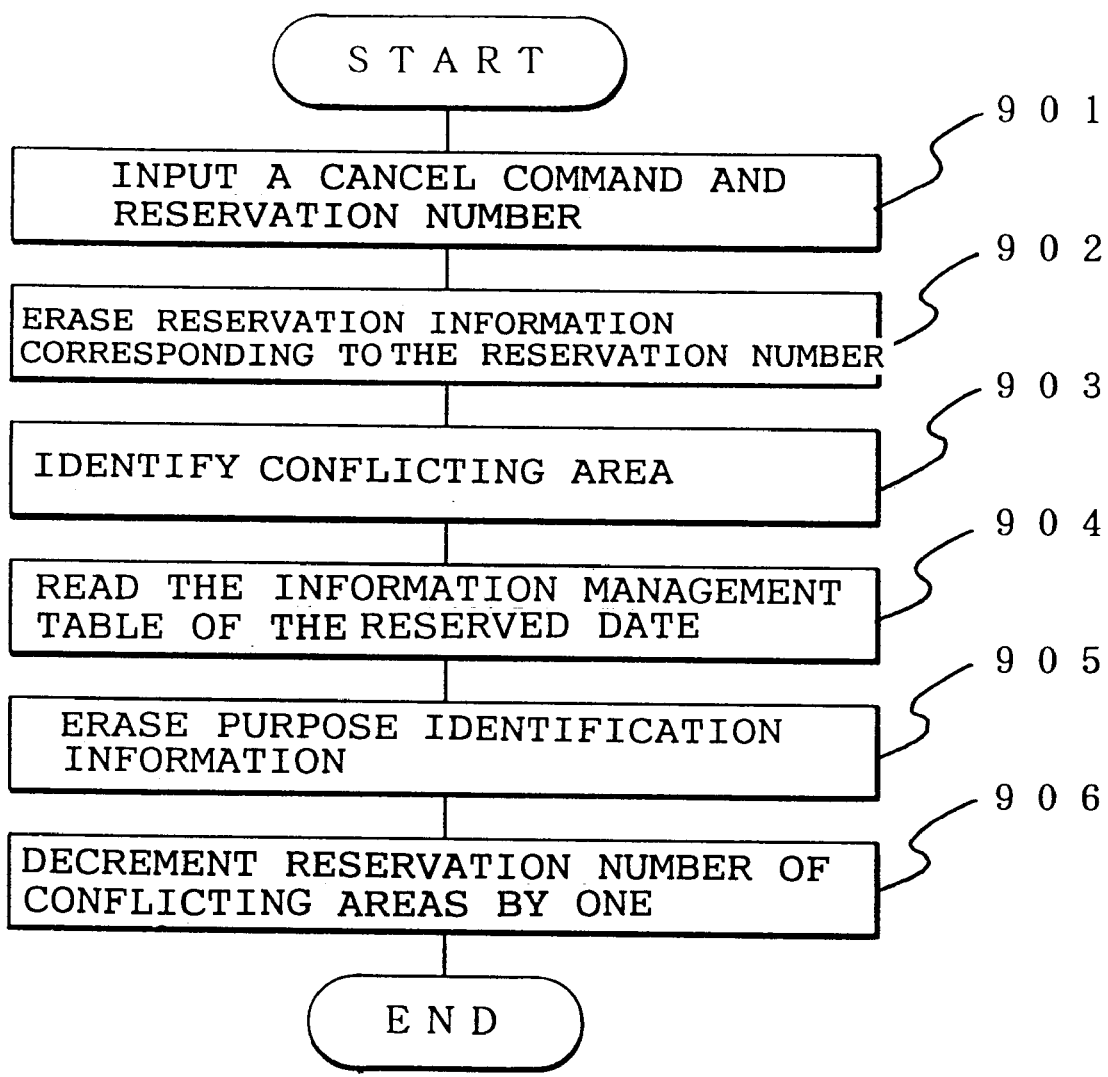
FIG. 9 is a flow chart of the operation of the system for canceling a reservation.

If a reservation management table of the input date is not found in the above step 813, the vacancy determination unit 3 transmits the banquet area name to the conflicting area detecting unit 4. Then the conflicting area detecting unit 4 reads the area code of the banquet area and area codes of conflicting areas from the management table in the main memory (MM) 10, and transmits them to the reservation unit 5. The reservation unit 5, upon receiving the banquet area and area codes of conflicting areas from the conflicting area detecting unit 4, reads a reservation management table format from the main memory (MM) 10, writes in the date, the purpose identification information, and reservation count "1" to the conflicting areas, and creates a new reservation management table (step 817). Further, the reservation unit 5 registers the new reservation management table with the group of reservation management tables, as well as registering the data on the reservation information input screen to the main memory (MM) 10. When the registration of the reservation is completed, the banquet hall provider notifies the customer of the reservation number provided on the reservation information input screen. The customer transmits the reservation number to the banquet hall provider if the customer wishes to cancel the reservation. The operation of the banquet hall reservation management system, when canceling a reservation, shall be described next with reference to FIG. 9.

Upon receiving a reservation number and a request to cancel the reservation, the banquet hall provider inputs from the keyboard 11, a command requesting to cancel a reservation information and the reservation number (step 901).

The banquet hall reservation management system activates the reservation unit 5.

The reservation unit 5 reads the reservation information corresponding to the reservation number from the main memory (MM) 10, and erases the reservation information (step 902).

The reservation unit 5 then activates the conflicting area detecting unit 4 and reads the area code of the canceled banquet area and those of the conflicting areas (step 903).

The reservation unit 5, after receiving the area code of the canceled banquet area and those of the conflicting areas from the conflicting area detecting unit 4, reads the reservation management table of the date from the group of reservation management tables (step 904). The reservation unit 5 further erases the purpose identification information registered in the time cells of the canceled banquet area in the reservation management table, and writes in the initial figure "0" (step 905). Then the reservation unit 5 decrements the reservation count registered in the time cells of the canceled banquet area by one (step 906).

As described above, the system of the present invention allows simple operation, as well as changing partition patterns of banquet halls without rewriting the application program.

What is claimed is:

1. A computerized banquet hall reservation management system, managing reservation of banquet halls capable of being partitioned into a plurality of areas, one area or a combination of the areas being used as one banquet area, said banquet hall reservation management system comprising:

a management information input screen displaying unit receiving reservation information;

a management table registering conflicting areas for each banquet area, said conflicting areas unable to be used while a banquet area is used;

a reservation management table registering the reservation information for each banquet area;

vacancy determination means for determining whether an arbitrary banquet area is unreserved on an elected date by referring to said reservation management table;

conflicting area detecting means for detecting, if said vacancy determination means determines that the arbitrary banquet area is unreserved, conflicting areas which are unable to be used while said arbitrary banquet area is used by referring to said management table;

reservation means for writing reservation information indicating that said arbitrary banquet area and said conflicting areas will be used on the elected date into said reservation management table;

a reservation information input screen notifying a user and displaying a reservation number when the registration of a reservation is completed; and reservation number transmitting means for transmitting the reservation number displayed by the reservation information input screen to a customer.

2. A banquet hall reservation management system as claimed in claim 1, wherein said reservation management table comprising a plural of reservation management tables per date.

3. A banquet hall reservation management system as claimed in claim 1, further comprising:

management information input means for inputting, when partition pattern of the banquet hall is changed, information concerning new banquet areas and conflicting areas which are unable to be used while said new banquet area is used; and management table generating means for generating a new management table according to the information inputted by the management information input means.

4. A banquet hall reservation management system as claimed in claim 1, wherein said reservation management table registers purpose identification information which identifies a purpose of using the arbitrary banquet area as reservation information of the arbitrary banquet area, and the number of banquet areas which are already reserved and inhibit the conflicting area from being used while the banquet areas are used as reservation information of the each conflicting area.

5. A banquet hall reservation management system as claimed in claim 2, wherein said reservation means generates, if said reservation management table has no reservation management table corresponding to said elected date, a new reservation management table, and writes purpose identification information which identifies a purpose of using the arbitrary banquet area as reservation information of said arbitrary banquet area and initial value "1" as the reservation information of said conflicting areas.

6. A banquet hall reservation management system as claimed in claim 4, wherein when a reservation for a banquet area is canceled, said reservation means detects conflicting areas of the banquet area by refering to said management table, and erases the purpose identification information of said banquet area from said reservation management table and decrement the reservation information of said conflicting areas by one.

7. A computer-readable storage medium storing a computer program to be executed by a computer for a banquet hall reservation management system managing reservation of banquet halls capable of being partitioned into a plurality of areas, one area or a combination of the areas being used as one banquet area, said computer program to perform the functions of:

registering in a reservation table conflicting areas for each banquet area, said conflicting areas unable to be used while a banquet area is used;

receiving reservation information for a banquet area;

registering in a reservation management table the reservation information for each banquet area;

determining whether an arbitrary banquet area is unreserved on an elected date by referring to said reservation management table;

detecting, if said arbitrary banquet area is unreserved, conflicting areas which are unable to be used while said arbitrary banquet area is used by referring to said management table; and writing reservation information indicating that said arbitrary banquet area and said conflicting areas will be used on the elected date into said reservation management table.

8. A computerized banquet hall reservation management system, managing reservation of banquet halls configured for being partitioned into a plurality of areas, one area or a combination of the areas being used as one banquet area, said banquet hall reservation management system comprising:

a management information input server displaying unit receiving reservation information;

a management table registering conflicting areas for each banquet area, said conflicting areas unusable used while a banquet area is used;

a reservation management table registering reservation information for each banquet area;

vacancy determination means for determining whether an arbitrary banquet area is unreserved on an elected date by referring to said reservation management table;

conflicting area detecting means for detecting, if said vacancy determination means determines that the arbitrary banquet area is unreserved, conflicting areas which are unable to be used while said arbitrary banquet area is used by referring to said management table;

reservation means for writing reservation information indicating that said arbitrary banquet area and said conflicting areas will be used on the elected date into said reservation management table;

a reservation input screen notifying a user and displaying a reservation number when the registration of a reservation is completed; and reservation number transmitting means for transmitting the reservation number displayed by the reservation information input screen to a customer.

* * * * *